(12) United States Patent
Sengir et al.

(10) Patent No.: US 7,280,977 B2
(45) Date of Patent: Oct. 9, 2007

(54) SYSTEM AND MODEL FOR PERFORMANCE VALUE BASED COLLABORATIVE RELATIONSHIPS

(75) Inventors: Gülcin H. Sengir, Bloomfield Hills, MI (US); Robert T. Trotter, II, Flagstaff, AZ (US); Devadatta M. Kulkarni, Rochester Hills, MI (US); Linda B. Catlin, Colorado Springs, CO (US); Elizabeth K. Briody, Troy, MI (US); Tracy L. Meerwarth, Bedminster, NJ (US)

(73) Assignee: General Motors Corporation, Detroit, MI (US)

( * ) Notice: Subject to any disclaimer, the term of this patent is extended or adjusted under 35 U.S.C. 154(b) by 206 days.

(21) Appl. No.: 10/682,588

(22) Filed: Oct. 9, 2003

(65) Prior Publication Data

US 2005/0080655 A1    Apr. 14, 2005

(51) Int. Cl.
*G06F 11/34* (2006.01)
(52) U.S. Cl. .......................................... 705/11; 705/1
(58) Field of Classification Search .................. 703/6; 705/8, 7, 11, 14; 715/734
See application file for complete search history.

(56) References Cited

U.S. PATENT DOCUMENTS

| | | | |
|---|---|---|---|
| 5,319,579 A * | 6/1994 | Lipner | 703/6 |
| 5,745,113 A * | 4/1998 | Jordan et al. | 715/835 |
| 6,038,543 A * | 3/2000 | Kurosawa | 705/11 |
| 6,216,098 B1 | 4/2001 | Clancey et al. | |
| 6,405,173 B1 | 6/2002 | Honarvar et al. | |
| 6,581,037 B1 * | 6/2003 | Pak | 705/1 |
| 6,594,673 B1 * | 7/2003 | Smith et al. | 707/104.1 |
| 6,832,245 B1 * | 12/2004 | Isaacs et al. | 709/206 |
| 2004/0059654 A1 * | 3/2004 | Schroder et al. | 705/35 |

FOREIGN PATENT DOCUMENTS

| JP | 07334070 A | * 12/1995 |
|---|---|---|
| WO | WO 2005015470 A1 | * 2/2005 |

OTHER PUBLICATIONS

Lam, Embedded firms, embedded knowledge: problems of collaboration and knowledge transfer in global cooperative ventures, Orgainization Studies, 1997, v.18, n.6, p. 973-996 (25 pages).*
Morelli, Mark D.; Eppinger, Steven D.; Gulati, Rosaline K. Predicting Technical Communication in Product Development Organizations IEEE Transactions on Engineering Management, vol. 42, No. 3, Aug. 1995.*

(Continued)

*Primary Examiner*—B. Van Doren
*Assistant Examiner*—Johnna Loftis

(57) ABSTRACT

The present invention provides a model for assessing performance of a dynamic collaborative relationship. The present invention provides a method of modeling dynamic relationships by inputting data related to the collaborative relationship into a model, which comprises a plurality of components key to the collaborative relationship. Each of these components is interrelated with the model, and the model generates a value indicative of a condition or performance of the relationship. The relationship value can be analyzed by comparison with baseline values correlated to exemplary collaborative relationships. The present invention further provides methods of developing a model capable of assessing dynamic collaborative relationships.

27 Claims, 4 Drawing Sheets

OTHER PUBLICATIONS

Garton, Laura; Haythornwaite, Caroline; Wellman, Barry. Studying On-Line Social Networks. chapter 4, Doing Internet Research, Steven Jones editor, Sage Publications, 1999, pp. 75-105.*

Puittinen, Rainer; Hameri, Ari-Pekka. Measuring and visualizing information transfer in networked collaboration. International Journal of Communication Systems, 12, p. 85-101. 1999.*

Benson, Peter Jackson, PhD. A Field Study of Communication Patterns in an Organization using the Negopy Computerized Network Analysis Technique. University of Denver, 1987, 233 pages. abstract only.*

McCord, Kent R.; Eppinger, Steven D. Managing the Integration Problem in Concurrent Engineering. Massachusetts Institute of Technology. Sloan School of Management Working Paper. Aug. 1993.*

Allen, Thomas. Architecture and Communication Among Product Development Engineers.*

An Introduction to Social Network Analysis from www.orgnet.com/sna.html□□.*

Chapter 4, Managing Core Competencies of the Corporation. The Advisory Board. Tactic #17: Organizational Network Mapping. 1996.*

Borgatti, Stephen P., "The Key Player Problem," Dynamic Social Network Modeling and Analysis: Workshop Summary and Papers (2003), p. 241.

Newman, M. E. J., "The Structure and Function of Complex Networks," SIAM Review, vol. 45, No. 2, (2003) pp. 167-256.

Newman, M. E. J., "The Structure of Scientific Collaboration Networks," PNAS, vol. 98, No. 2, Jan. 16, 2001, pp. 404-409.

Peay, Edmund R., "Connectedness in a General Model for Valued Networks," Social Networks, 2 (1980) pp. 385-410.

Sastry, M. Anjali, "Understanding Dynamic Complexity in Organizational Evolution," Chpt. 13, In Dynamics of Organizations, Lomi, A. & Larsen, E., eds, AIII Press, Menlo Park, CA; (2001) pp. 377-404.

Freeman, Linton C., "Visualizing Social Groups," American Statistical Association, 1999 Proceedings of the Section on Statistical Graphics, Jun. 2000, 47-54.

* cited by examiner

START-UP STAGE

MATURE STAGE

COURTSHIP STAGE

MID-TERM STAGE

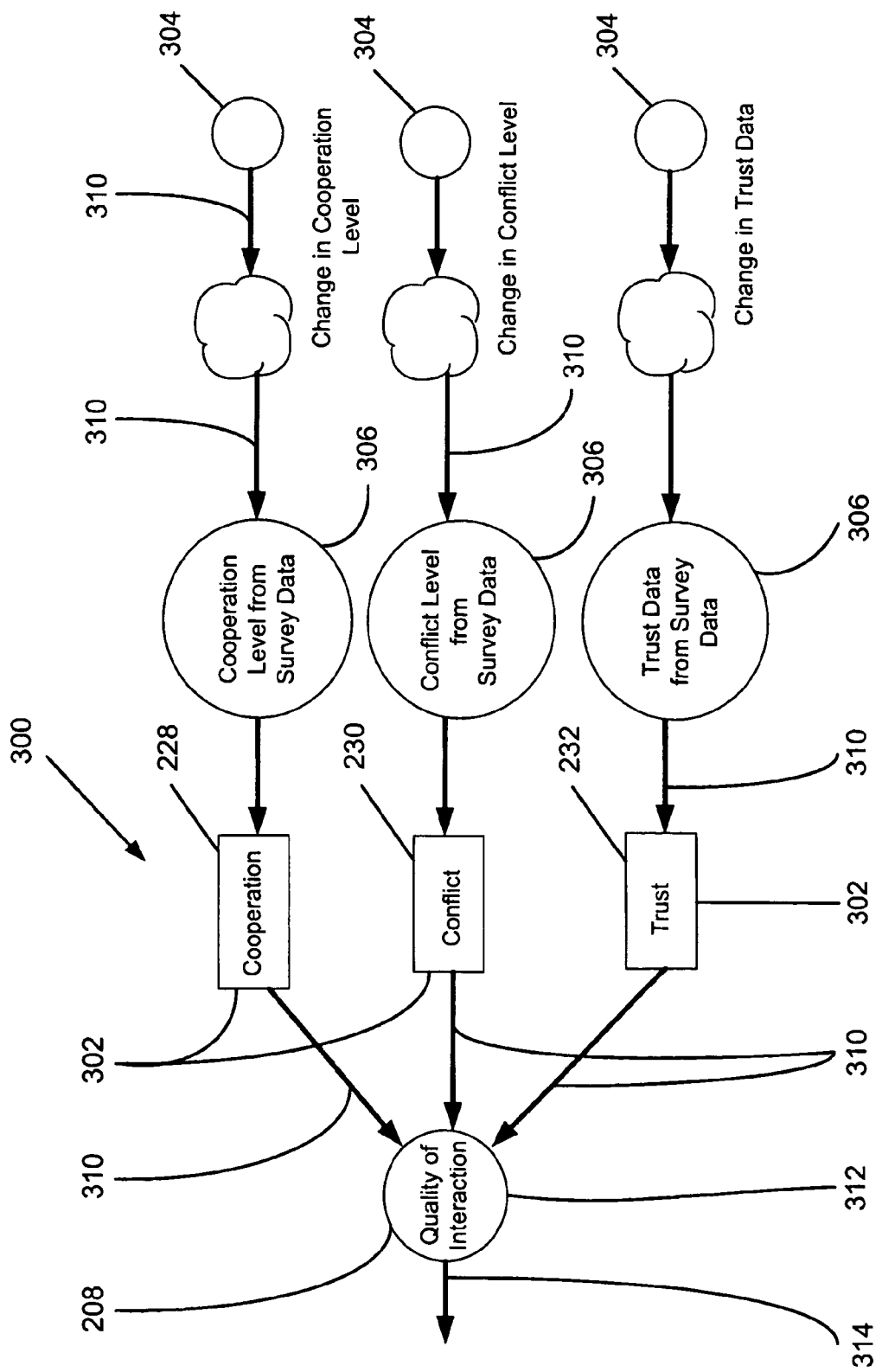

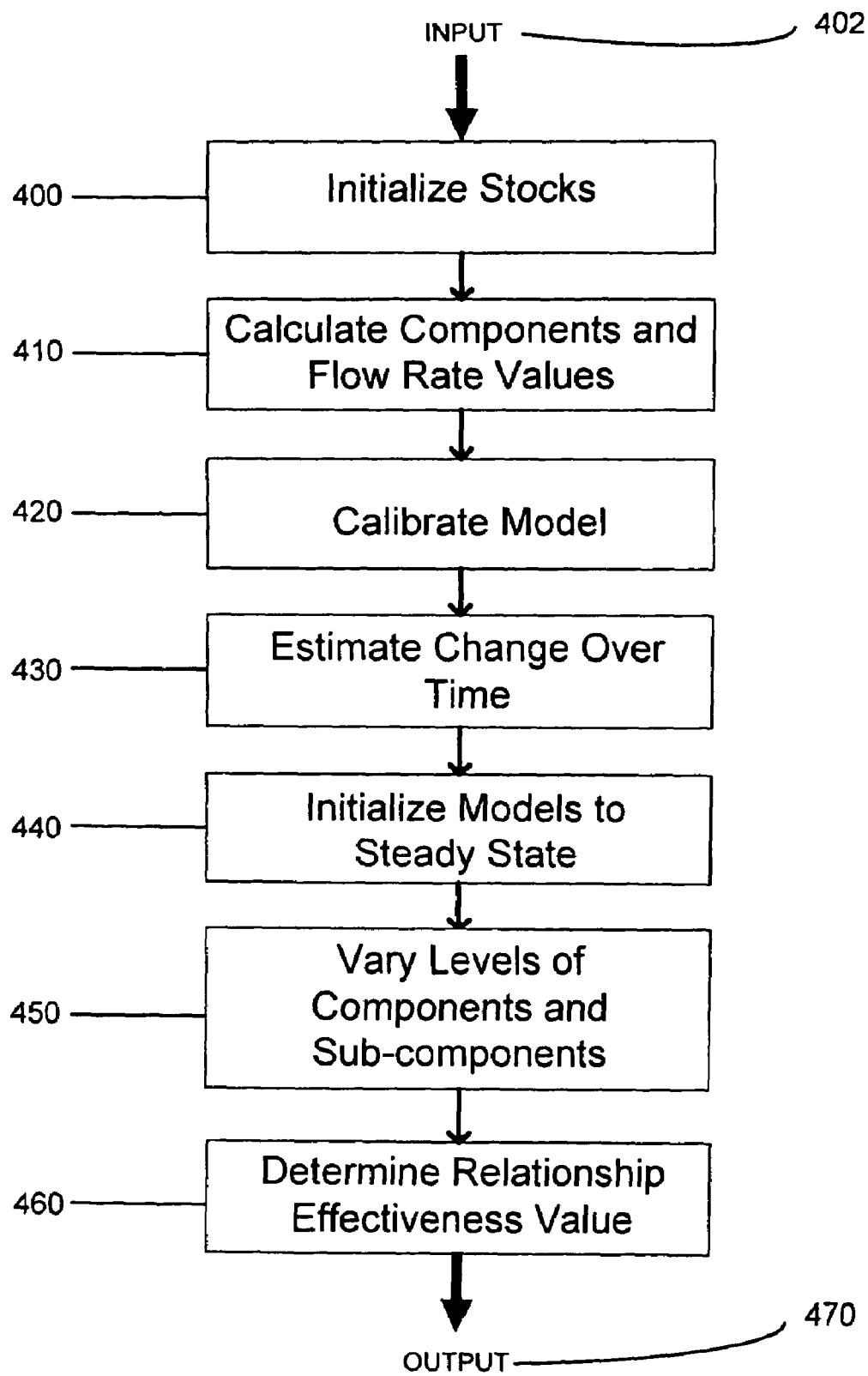

SYSTEM AND MODEL FOR PERFORMANCE VALUE BASED COLLABORATIVE RELATIONSHIPS

FIELD OF THE INVENTION

The present invention relates to assessing collaborative relations, and more particularly to a methodology to analyze the performance of collaborative relationships.

BACKGROUND OF THE INVENTION

Collaborative relationships, such as collaborative partnerships, are prevalent in the public, private, and non-profit sectors. Each entity involved in a collaborative relationship, brings a unique set of skills, knowledge, and talents, providing important contributions in their respective areas of specialty. Such partnering entities may be intra-organizational (e.g. the entities in the collaborative relationship are different divisions or departments within the same organization) or inter-organizational (e.g. two distinct organizations in a collaborative relationship). Generally, collaborative partnering relationships are initiated due to the anticipated benefits they bestow on the respective entities. However, each entity brings a unique set of relationship issues, conditions, and values that affect the partnership. Many different relationship characteristics impact the overall performance of the partnership relationship, and it is desirable to be able to predict the important issues that arise in a collaborative relationship, prior to failure or significant expenditure of resources. Thus, there is a need to accurately model and simulate current partnering relationships, to understand how relationships change over time for assessment and characterization of such relationships.

SUMMARY OF THE INVENTION

The present invention provides a method of modeling a collaborative relationship comprising providing a model having components including: level of joint work, level of communication, quality of interaction, and connectivity of social structure of the relationship. The model tracks interrelationships between each component as a function of a relationship duration. Data relative to the collaborative relationship is input into respective components of the model; and an output value is determined corresponding to a condition of the collaborative relationship by analyzing the data with the model.

Another preferred embodiment of the present invention provides a method of modeling relationship dynamics of collaborative relationships comprising providing a model having components including: level of joint work, level of communication, quality of interaction, and connectivity of social structure of the relationship. The model tracks interrelationships between the components, and at least a portion of the components as a function of time. Data relative to the collaborative relationship is input into respective components of the model; and an output value is determined corresponding to a condition of the collaborative relationship by analyzing the data with the model. A condition of the collaborative relationship is determined by comparing the output value to a baseline value generated by the model.

A method of developing a model for a collaborative relationship between distinct entities, the method comprising: collecting data related to the collaborative relationship from a plurality of sources within each of the entities in the relationship. The data is analyzed and establishes significant features of the relationship. A model is created having a plurality of components integrating the significant features, where the model is dynamic. The method further comprises developing a baseline value indicative of an exemplary relationship status by inputting exemplary data into the model corresponding to a selected evolutionary stage.

In another alternate preferred embodiment, the present invention provides a method of developing a model for a collaborative relationship between distinct entities, the method comprising: a) collecting qualitative data related to the collaborative relationship from a plurality of sources within each of the entities in the relationship; b) analyzing the qualitative data and generating a plurality of components of a model related to the collaborative relationship; c) collecting quantitative data related to the collaborative relationship; d) analyzing the quantitative data; e) creating a baseline model having the plurality of components integrating the statistical and structural analysis; and f) developing a quantitative baseline value indicative of an exemplary relationship status by inputting exemplary data into the model corresponding to a selected evolutionary stage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a shows a courtship stage, FIG. 1b shows a start-up stage, FIG. 1c shows a mid-term stage, and FIG. 1d shows a mature stage of the collaborative relationship;

FIG. 3 is a schematic diagram of a systems dynamic theory application used in preferred embodiments of the present invention; and FIG. 4 is a flow chart of operation of a preferred embodiment of the present invention.

DETAILED DESCRIPTION OF THE PREFERRED EMBODIMENTS

Figure 1B:
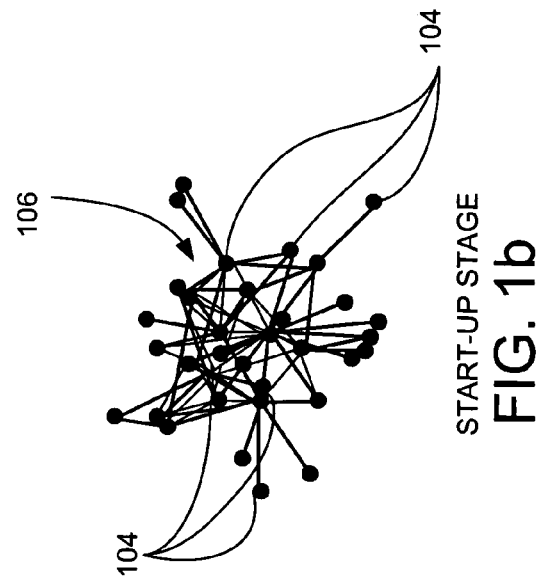
FIGS. 1a, 1b, 1c, and 1d are exemplary pictorials of three dimensional structural components that show various life cycle stages of a collaborative relationship prepared in accordance with the present invention, where
Figure 1D:
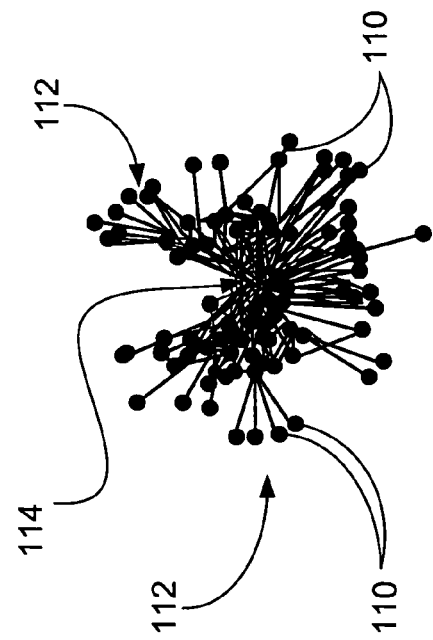
Figure 1A:
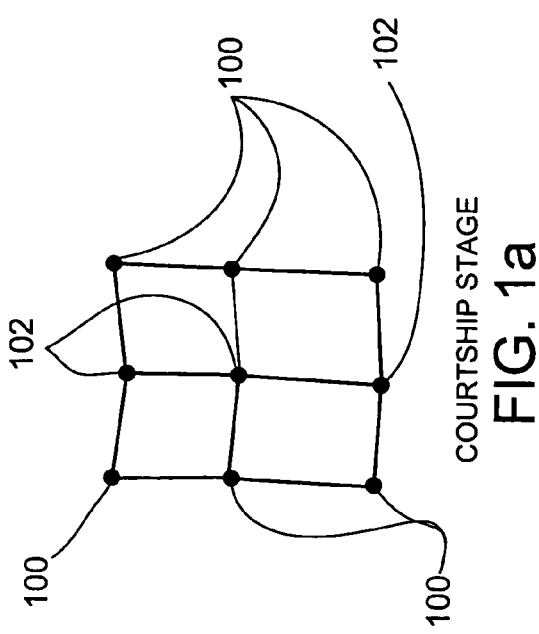

The following description of the preferred embodiment(s) is merely exemplary in nature and is in no way intended to limit the invention, its application, or uses.

The present invention provides a system and model for characterizing collaborative relationships and exploring and tracking the impact of changes in the collaborative relationships. As used herein, the term "collaborative" refers to a relationship between two entities working together to achieve a common objective or goal. In certain preferred embodiments of the present invention, a collaborative relationship is a partnership between two organized entities participating together to pursue mutual interests. The present invention is particularly useful for tracking and assessing relationship performance by using a model that generates a relationship effectiveness value. The relationship effectiveness value is calculated by inputting data related to features of the relationship collected from participants in the relationship. The term "value" relates to both qualitative and quantitative aspects of the relationship. In one aspect, the value is compared to a baseline value to determine the relative effectiveness of the relationship. Such a comparison is useful for predicting future relationship success, as well as diagnosing potentially effective and/or problematic areas of existing relationships. In preferred embodiments, the model is a decision-support tool which simulates the cause and effect among the significant features or model components, which are interrelated. In another aspect, the model of the present invention is used to diagnose and identify partnership issues, with the intent of improving the quality of existing partnerships, and to predict likely partnership issues based on an evolutionary stage in the partnership cycle. In a further aspect, the model is also useful for benchmarking and planning future collaborative partnership relationships, by use of an exemplary baseline model.

The system and model of the present invention has two important applications for those engaged in partnership and collaborative relationship decision-making, especially in the business, commercial, academic, and industrial settings. First, it is used to create hypothetical partnership scenarios that can be tested against projected or current relationship scenarios. For example, the preferred embodiments of the model of the present invention simulate changes in partnership dynamics over time, addressing issues such as the interrelatedness of the features of the collaborative relationship, and what impact changes in collaborative relationships have on other aspects of the relationship (e.g. if conflict increases or communication improves). Second, the model of the present invention is used to test data collected for new collaborations (or subsequent data on old partnerships) to compare with values generated by a baseline model, because preferred embodiments of the present invention have the capability of executing empirically-based analyses. Thus, various aspects of a collaborative relationship can be explored and compared with data collected from existing relationships. Further, in certain preferred embodiments, the present invention incorporates a qualitative portion of collected data, which additionally explains patterns emerging from the model simulations.

To better understand the present invention, a brief background on collaborative relationships will be described herein. Relationships, by their nature, are reciprocal since they involve the mutual exchange of ideas, favors, and the like. The present invention is based upon the concept of reciprocity, which includes the combined influences of many different socio-cultural components that ultimately affect relationships in collaborative partnerships. The concept of reciprocity comes from anthropological theories of exchange. It includes both positive and negative dimensions of reciprocity (i.e., generalized, balanced, and negative). Relationships have a dynamic quality as well. The concept of dynamics focuses on the study of forces, mostly related to bodies in motion, but also to those in an equilibrium state. Combining them into relationship effectiveness focuses the study of changes in the nature of reciprocity in the partnering relationships over time or space and on equilibrium/balance in the relationship. These dynamics are based on the cultural rules of a particular group.

Relationship effectiveness is affected by cultural components external to the given relationship. These cultural influences (e.g., values, ideals, roles, allocation of resources, duration of the relationship) combined with factors associated with the participants themselves (e.g. their role, interest) modified by the structure of the relationships, directly impact the expression of relationship effectiveness, and hence the status of the relationship, at any given point in the relationship. In the context of collaborative relationships, particularly in equity and non-equity contexts (e.g. between industry and academia) the failure rate of these partnerships is high, largely due to differences in organizational structure and cultural issues. Modeling relationship effectiveness makes collaborative relationship interactions visible, and thus knowable. In certain preferred embodiments of the present invention, the model is based on empirical data that is used to diagnose and predict partnership difficulties from previously studied actual collaborative relationships. From this diagnosis, interventions are designed and implemented to improve the effectiveness of the collaborative relationship. The present invention recognizes that relationship effectiveness is composed of many different socio-cultural components, and identifies the most salient components, of a collaborative relationship, which are incorporated into preferred embodiments of the present invention. Further, systems and models according to the present invention combine the modeling power of analyses of qualitative data, systems-dynamics theory, statistical analyses, and social-network analyses to characterize collaborative relationships.

Preferred embodiments of the present invention combine social-network analysis and statistical analysis, with simulations based on systems dynamics software, to create a model that simultaneously addresses the relationship structure and the dynamic aspects of organizations. Preferred aspects of the present invention account for evolution or change in the structure the collaborative relationship. Prior art methods of characterizing business relationships have not addressed the evolution of networks, but rather provide only point-in-time instantaneous evaluation. Other preferred aspects of the present invention include the ability of the model to represent the culture of an inter-organizational entity. Another preferred aspect of the present invention is that the model tracks the interrelatedness of the important features of the collaborative relationship, which improves the accuracy of the modeling system. The model is capable of combining diverse populations and characterizing complicated inter-organizational collaborative partnerships, as where prior art methods focused merely on more simple single homogeneous organizations.

One preferred embodiment of the present invention pertains to a method of developing a model for characterizing a collaborative relationship between distinct entities. The method comprises constructing a model based on input from all data sources related to the collaborative relationship, and analyzing these data sources. More particularly, the method comprises collecting data related to the collaborative relationship from a plurality of sources within each of the entities in the relationship. The data may be qualitative, quantitative, or both, and collected from multiple sources from the relationship (e.g. participants, reports, observation), including data from both of the entities involved in the collaborative relationship. Significant features related to the relationship are identified based upon analysis of the collected data. Significant features of the collaborative relationship are established by analyzing the gathered qualitative and quantitative data. "Significant features" are defined as important attributes, dimensions, characteristics, or aspects of the collaborative relationship. The significant features are identified primarily from finding salient patterns in the data.

A model is then created which has a plurality of components, which are preferably interrelated, that integrate the significant features and the evolutionary stage of the collaborative relationship. In certain preferred embodiments of the present invention, the model is dynamic as a function of time. The evolutionary status of the relationship relates to the life cycle stage. The model according to the present invention applies the concept of such evolutionary stages to the relationship cycle through the components of the model. The relationship is characterized by identifying an evolutionary stage of the relationship, and relating that stage or status as a function of time. The model is thus framed in terms of collaborative relationships, where the significant features correspond to a plurality of components of the model that are identified as being central to collaborative relationships. A baseline value indicative of an exemplary relationship status is generated by inputting exemplary data into the model, where the relationship status corresponds to a selected evolutionary stage of the collaborative relationship.

In such preferred embodiments, a model is thus created by integrating the significant features and evolutionary status of the collaborative relationship. The model can optionally be dynamic, with components being responsive to a passage of time, expressed through a plurality of evolutionary stages of the relationship. A baseline value, which is preferably indicative of an exemplary relationship status, is developed by inputting data into the model and preferably corresponds to and identifies a select evolutionary stage of the exemplary relationship. A target relationship is assessed by the model which determines an output, or a relationship value, by analyzing input data which corresponds to the significant features and the structure of the target relationship. The target relationship value is compared to the baseline value developed for an exemplary collaborative relationship at a corresponding evolutionary stage to enable assessment and characterization of the target relationship by being input and analyzed.

In developing the model of the present invention, significant or key features for the model were identified primarily based on the qualitative data, as described above. Basic building blocks (i.e., concepts, stocks, flows) are defined and are related to the significant features and interactive relationships. The model is then validated, or tested, using scenarios run on previously collected empirical data which developed a baseline model.

Data is collected from as many sources (e.g. participants, reports, observations, and the like) as possible, within the entities of each side of the collaborative relationship. It is preferred that the sampling of participants for data collection comes from a representative cross-section of the total number of involved participants. It is preferred to maximize the percentage of participants in the data collection, for the most comprehensive coverage regarding the relationship.

Data collection from participants in the collaborative relationship preferably includes collecting both qualitative and quantitative data. Qualitative data research may include open-ended questionnaires and social-network surveys. Preferred qualitative data research for the present invention comprises direct observation opportunities, interviews, and focus groups. Quantitative data research may be gathered from qualitative data (e.g. frequency counts), social-network surveys, or questionnaires which provide quantitative or numerically rated responses to various questions. In preferred embodiments of the present invention, a multi-method approach to data-collection is employed, which includes interviews, focus groups, direct observation, and a quanfitative social-network survey.

In preferred embodiments of the present invention, a variety of different collaborative relationships at different stages of development are studied, to enhance the accuracy of the model. Qualitative data collection may include, for example, interview questions that focus on the nature of the participants' past and current relationships with their counterparts, perceived success factors and obstacles confronting the relationship/partnership, institutional/organizational cultures of the respective participants, and expectations about the future of the relationship. Focus groups may include multiple participants responding to questions focused on relationship goals and expectations, the participants' current assessment of the relationship, recipes for an ideal relationship, and ideas for strengthening these long-term relationships. The social-network survey is preferably designed to gather quantitative data on relationship structure, dynamics, and roles. For example, the survey may contain questions about communication, joint work, roles in the relationship, connection to others in the relationship, trust, cooperation and conflict, which forms the basis of the model, and establishes the ideal ways of initiating, maintaining, or improving a relationship. It is preferred that the survey response rate is in the range of between about 50% to 100%, although lower response rates in the survey (e.g. about 25%) are acceptable for developing the model.

After collection, the qualitative data is analyzed in accordance with the supporting theories for the model of the present invention to establish the significant or key features of the collaborative relationship. It is preferred that the analysis of the data comprises both inductive analysis and a comparative empirical-analysis strategy which focuses on themes and patterns which emerge from the qualitative responses. Preferred methods of analyzing the qualitative data entail identifying the key feature elements (e.g., the structure of collaborative relationship, the collaboration process, relationships, values and ideas, for example) found in the interviews and focus groups. Also, identifying key quotes or verbatim data summarizing or illustrating important themes or content areas, as well as identifying any linkages pertaining to themes and patterns emerging from all the interviews and focus groups data research. In preferred embodiments of the present invention, the analysis of qualitative data further includes the method of analysis selected from the group consisting of: content analysis, inductive analysis, social-network theory, comparative empirical analysis, and combinations thereof.

According to certain preferred embodiments of the present invention, the quantitative data collected (e.g. from the social-network survey) is analyzed using egocentric network analysis, statistical analysis, soclometric analysis of reciprocal social-network data, and network visualization. The egocentric analysis allows for comparison of individuals, as well as groups, in a variety of areas such as communication patterns, trust, conflict, work importance, cooperation, and other variables. Further, the quantitative data is preferably analyzed by sociometric analysis. Sociometric analysis can be used to derive network characteristics, which relate to the structure of the relationship. The sociometric data analysis permits pooling of the responses from all of the individuals in a collaborative relationship to analyze the structure of the relationship (e.g., connections, distance, density), as well as roles of individual participants, measures of influence, subgroups, and other measures of both association and communication.

In performing the egocentric and sociometric analyses of the quantitative data, it is preferred that the analysis is conducted by any commercially available software, such as, for example egocentric network programs like FATCAT, which is available from Simon Fraser University of Vancouver, Canada, which is an egocentric data-analysis program. FATCAT analyzes 2-mode (actor by attribute) data using a variety of statistical routines. Other suitable egocentric network programs include MULTINET, also available from Simon Fraser University of Vancouver, Canada. Basic sociometric programs, such as UCINET X, which is commercially available from Analytic Technologies of Harvard, Mass., are used to further analyze the quantitative data to develop the model according to the present invention. UCINET is a social-network-analysis tool. Data can be imported or directly entered in a number of different formats. UCINET data-analysis routines include most of the standard sociometric measures of network structure and dynamics including a) cohesion (e.g., distance, reachability, point connectivity), b) regions (e.g., components, k-cores) c) subgroups (e.g., cliques, k-plexes, factions), d) centrality (e.g., degree, closeness, betweeness), e) ego networks, f) core-periphery, g) roles and positions, and h) whole network properties (e.g., density, transitivity).

Further preferred programs for quantitative data analysis include network role programs, like Key Player, which is available from Analytic Technologies, which imports UCINET output data and performs three basic analyses. The first two analyses are based on the removal of one or more key nodes. They provide the level of impact on the network based on the fragmentation caused by the removal of the key player(s), and the increase in average distance between nodes caused by the removal of the key player(s). The third analysis identifies the overall reach of one or more key players, depending on the number of edges that connect them to other people.

Further, in preferred embodiments of the method and model of the present invention, a network visualization process is used to compare structural analysis of the collaborative relationship networks. Network visualization programs explore the dynamics and evolution of the network, both as individual and overall collaborative projects (i.e. a compilation of many different collaborative relationships that a single entity may be involved in). Preferred visualization programs utilize both two and three-dimensional visualizations, in some cases using kinetic images, and in other cases, attributing analysis on a color basis and structural dimensions. Three programs are particularly valuable for the visualization analysis, and are preferred for use in structural analysis of collaborative relationships in accordance with the present invention. These programs are PAJIK, NETDRAW, and MAGE.

NETDRAW is commercially available from Analytic Technologies and imports UCINET data files and provides an optimized two-dimensional display of the network nodes (people) and edges (connections), including the directionality of the connections. The program allows for a visual analysis of several key attributes of the network data, including a) isolates, b) components, c) blocks and cutpoints d) k-cores, and e) subgroups. The program also allows several different kinds of transformations of the shape of the data, including circle layouts, grower-metric-scaling layouts, node-repulsion layouts, as well as deleting isolates and pendents. MAGE is available from Duke University of Chapel Hill, N.C., and is a network-visualization program. It creates a three dimensional kinetic image that can be interactively rotated from any point of reference (node) within the matrix. The program allows different attributes of nodes and edges to be color coded, to assist in visualization analysis. PAJIK is a software program for analysis of large networks created and Is available from the University of Ljubljana in Slovenia.

The collected quantitative data from the survey is preferably further analyzed to make statistical inferences and generate input data for the model. Statistically enabled inferences can be gathered on composite characteristics of individuals and groups, and assist in the creation of relationship profiles. Preferred software programs useful for such statistical analysis include, for example, Statistical Package for Social Sciences (SPSS) available from SPSS, Inc. of Chicago, Ill., and Statistical Analysis System (SAS) available from SAS Institute, Inc., of Cary, N.C., which provide descriptive statistics. The survey data collected was further cross-tabulated by the questions posed to determine the levels of communication frequency, communication importance, joint work frequency, joint work importance, trust, conflict and cooperation among individual participants in the collaborative relationships, by the frequency of respondents with answers.

It was assumed that the aggregate of responses from all of the participants from both entities in the collaborative relationship represented the behavior of the collaborative relationship at the time the survey was conducted. The frequency of the responses as a percentage of the total, which is adjusted by the size of the respondent population size, is assumed to be the scale value of a response. Percentile range values corresponding to the $5^{th}$, $50^{th}$, and $95^{th}$ percentile ranges were used to represent low, medium, and high levels of various features in the simulations. Additional assumptions made in developing a preferred embodiment of the present invention included that responses for each collaborative relationship could be used to represent the levels of key features or issues for the time frame or stage (in the life cycle of the relationship) that each represented. It is preferred that multiple independent collaborative relationships populate the empirical data used to develop the model, and further that the collaborative relationships have been monitored and data collected at regular intervals or evolutionary stages during the relationship life cycle. Thus, time dependence was analyzed by using such collaborative relationship data. The form of time dependence that best fit the observed data varied from linear, polynomial and logarithmic, and was appropriately characterized by the trends observed over time. Thus, preferred analysis of quantitative data according to the present invention is performed by a method of analysis selected from the group consisting of: egocentric network analysis, statistical analysis, sociometric analysis, network visualization, and combinations thereof.

As previously mentioned, one important and preferred aspect of the methods and model according to the present invention includes the ability to capture data, compare, and simulate a dynamic relationship, by tracking time and the interrelationships of relationship components. Previous approaches to characterizing business relationships have been point-in-time or instantaneous applications, which do not account for the changes that occur in a relationship as time passes. Further, previous models have been unable to accurately predict relationships due to the sophistication of intertwined components. The model of the present invention accounts for the interrelatedness of the relationship components. The model may optionally be dependent on time to reflect a duration of the collaborative relationship. The time dependence of the present invention is based upon a theory, known as system dynamics. System dynamics (SD) is a method for describing, modeling and simulating dynamical systems. SD was originally developed in the 1950's and 1960's at the Massachusetts Institute of Technology (MIT) by Jay W. Forrester, as a set of tools for relating the structure of complex managerial systems to their performance over time, via the use of simulation.

SD employs feedback loops, such as those encountered in electrical and mechanical-control systems. SD concepts such as "stocks and flows" describe the primary system structures and processes, and how they are connected by feedback loops. Stocks refers to input and flows refers to outputs. Such feedback loops capture the non-linear characteristics of social interactions that are part of a systems approach to modeling. Focusing on flows and stocks of information, people, and other resources has led to the exploration of complex dynamics and temporal characteristics of organizations. SD models are particularly apt for use in simulating the social domains of organizations, because the target is a dynamic entity which changes and reacts to a surrounding environment, with the entity having both structure and behavior. The SD portion of the model can be represented as an equation, a logical statement, or a computer program. The model of the present invention comprises a system with elements represented as stocks, converters, flows, and feedback loops that change over time in accordance with SD theory. SD software products allow the design of system models in a graphical mode as flow diagrams. Suitable SD software includes STELLA from High Performance Systems, Inc. which is a system dynamics software program, which enables creating models of structural stock-flow-diagrams and time-series analysis. Powersim by Business Simulation Company, and Vensim by Ventana Systems, Inc. are other suitable examples of SD modeling software.

In one particular example, the model incorporating SD theory employs Euler's method to make the significant features or elements of the collaborative relationship responsive to time. This is done by initializing each stock (i.e. each significant feature or element or sub-element) at a start time of zero, so that $stock_{t=0}$=data normalized from the quantitative survey. The change in stocks is estimated over an interval dt, where $\Delta_{stock}$=dt(flow), and flow is defined as the rate of change corresponding to the evolutionary stage of the collaborative relationship cycle. A new value is calculated for stocks, based on the estimate above, expressed as stock, =$stock_{(t-dt)}+\Delta_{stock}$. In one preferred embodiment of the model of the present invention, the simulation step time (i.e. dt) is selected to be 0.25 years. By employing regression, the flow rates are calculated to reflect how composites would behave over time as the slope of the best-fit line between the baseline-model data points. The model was initialized to steady state. The levels of stocks related to a significant feature were varied one by one, while observing the effect on the corresponding significant features or components. Several theoretical and empirical scenarios tested the utility of the computer simulations, which were then displayed graphically as the output of the systems-dynamics model. In this manner, the model of the present invention handles both the effectiveness and dynamics of the collaborative relationship.

In an alternate preferred embodiment of the present invention, a method of developing a model for a collaborative relationship between distinct entities is provided and comprises collecting qualitative data related to the collaborative relationship from a plurality of sources within each of the entities in the relationship. The qualitative data is analyzed by a method of analysis selected from the group consisting of: content analysis, inductive analysis, comparative empirical analysis, and combinations thereof, and thus generates a plurality of components of a model related to the collaborative relationship. Quantitative data is then collected, which is related to said plurality of components of the collaborative relationship. The quantitative data is analyzed by a method of analysis selected from the group consisting of: egocentric network analysis, statistical analysis, sociometric analysis, network visualization, and combinations thereof. Statistical analysis of quantitative data is useful for refining all components of the model. Other methods are more useful for certain components and sub-components, such as for example, sociometric, egocentric, and network visualization analysis, as described above, which are useful for analyzing the structural features or components of the relationship.

A baseline model is thus created which has a plurality of components integrating qualitative, statistical and structural analysis. A quantitative baseline value is developed, which is indicative of an exemplary relationship status by inputting exemplary data into the model corresponding to a selected evolutionary stage. A quantitative target relationship value can then be generated by assessing a target collaborative relationship using the model. The data related to the target collaborative relationship (and corresponding to the components) is input into the model. The quantitative target relationship value generated is then compared to the baseline value at selected evolutionary stage to characterize the relationship. Further, after the model is created, new data from a collaborative relationship can be input.

An accuracy of the results flowing from the model can be validated in several different ways. Validation can be done by assessing whether the model generates plausible values and thus operates in a manner consistent with the general principles of collaborative relationships/partnerships. Other methods of validation include obtaining feedback from study participants and examining the qualitative data to further calibrate the model. Such validation may take the form of reviewing the results with the individuals from the collaborative relationship who participated in the study. In other preferred methods of validation, individuals who were not participants in the original survey are employed to review the accuracy of the characterization of the collaborative relationship. Additionally, this validation method (using non-participants in the original study), may be combined with the validation method using those participants who did participate in the original study, to provide more comprehensive coverage. Such a validation process, verifies the validity and accuracy of the model results, and highlights any potential gaps in data collection used as input to the model. In this manner, the model is optimized to enhance characterization and assessment of collaborative relationships.

As previously discussed, the structure, interrelatedness of features, and evolution of collaborative relationships are incorporated into the model, by accounting for the stage of relationship life cycle. Initial qualitative analyses of the relationship structure and stage of maturity of a variety of collaborative relationship relationships leads to the characterization of the relationship into six stages in a lifecycle for the collaborative relationship.

Such evolutionary stages of the relationship may be designated as "Selection" where a relation entity is selected for a possible collaborative relationship, "Courtship" where each of the independent entities contacts, communicates, and negotiates with one another about a potential collaborative relationship, "Start-Up" where the entities have committed to be in a collaborative relationship, "Mid-Term" as an intermediate stage of progression in the collaborative relationship, "Mature", where the collaborative relationship has been functioning for a relatively long period of time, and "Transition", where a collaborative relationship reaches the end stage for the life cycle, and where decisions about continuing or renewing the collaborative relationship are made. Multiple stages are used to create the baseline model. In certain preferred embodiments of the present invention, the stages which created the baseline model are selected to reflect an exemplary of representative relationship.

FIGS. 1a, 1b, 1c, and 1d, show examples of structural conditions in the middle four stages of a collaborative relationship life cycle. These figures are three-dimensional representations of actual exemplary collaborative relationship structures based on data collected from actual network surveys of collaborative relationships. The relationship cycle begins with individuals connected with very simple ties that are established during the early relationship negotiations in FIG. 1a. In this courtship stage, there is an overriding emphasis on the goals and objectives of the collaborative relationship. Dots representing participants of the first entity to the collaborative relationship are numbered 100, while dots numbered 102 represent participants of the second entity to the relationship. The courtship period is illustrated using two "thrust" or joint-work areas. The initial ladder design is the theoretical starting point for the collaborative relationship, after the selection stage. The "ladder" represents the process of matching up individuals from each of the first and second entity organizations, based on their areas of expertise and their positions in their respective institutional hierarchies. By using this multi-level seeding condition the relationship moves from the courtship phase to the start-up phase.

FIG. 1b depicts the start-up stage structure that represents the establishment of key relationships, depicted by a plurality of individuals 104 participating in the relationship. In the start-up stage, core interactions hold the overall collaboration together and on course. Thus, a core structure 106 is established where certain individuals 104 are well-connected. The early stages, such as courtship and start-up, are dominated by the need for clear communication and the creation of common goals, objectives, and joint-work plans.

Figure 1C:
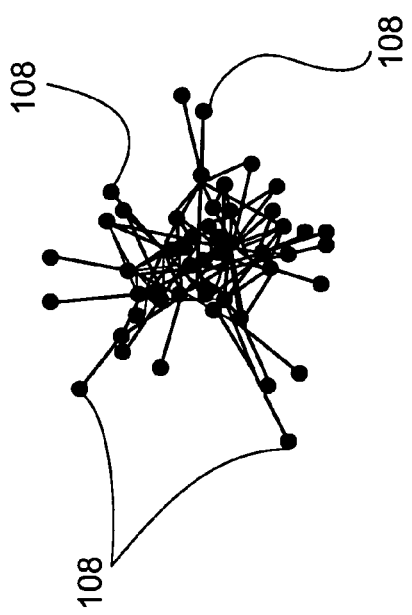

As both the structure and the joint work of the collaboration mature, sub-groups 108 become visible in the overall structure as can be observed in FIG. 1c, reflecting the emergence of distinctive clusterings of sub-groups 108 of joint work. During the mid-term phase of the relationship, the emphasis is on increasing joint work, in addition to maintaining existing positive relationships. Finally, in the mature stage shown in FIG. 1d, the collaborative relationship has changed by allowing the relatively-loose working sub-groups (108 of the mid-term stage) to form into a functional-fan structure. Intensely-collaborative groups 110 engaged in joint work are connected by a core central global structure 114. The "fans" of the structure are comprised of fan-shaped structures 112 composed of sub-groups 110, which accomplish the overall joint-work goals of the program, while the globular core 114 maintains a high level of overall collaboration and relationship value for the relationship as a whole.

Figure 2:
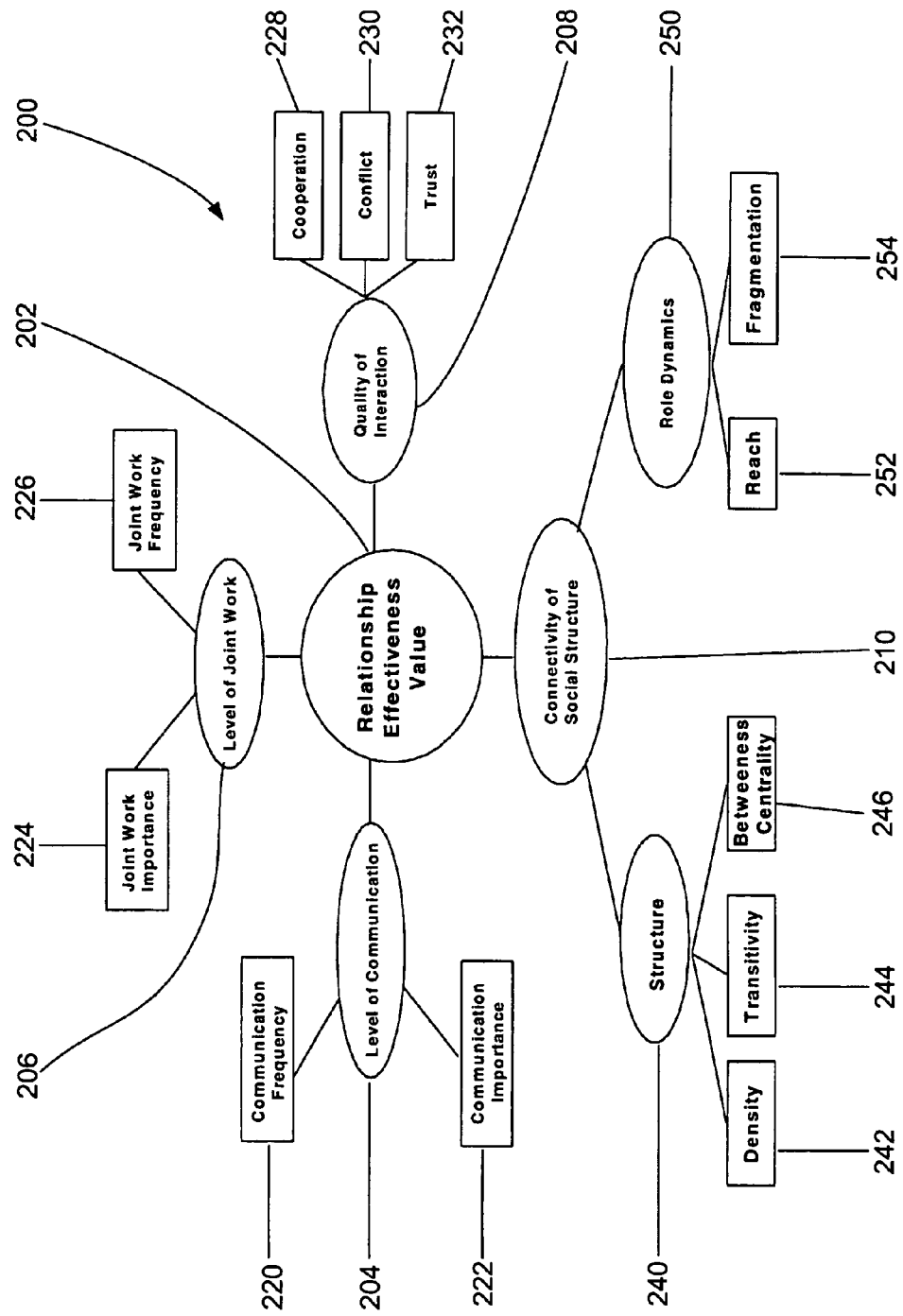
FIG. 2 is a diagram of a model of one preferred embodiment of the present invention.

Thus, according to preferred embodiments of the present invention, a model is developed that accounts for significant features of a dynamic collaborative relationship. Based upon the research corresponding to the present invention, a model 200 has been developed that specifies relationship effectiveness as a composite of four basic system-level components, as shown in FIG. 2. The model 200 calculates a quantitative relationship effectiveness value 202 in a collaborative relationship. As recognized by one of skill in the art, the preferred embodiment of the model 200 described herein, is not limited to the four components set forth, and may vary based upon the specific characteristics of the relationship or respective entities, and may comprise more or less components and sub-components, while achieving the same results through the model by similar methodology. A first significant component 204, that contributes to the calculation of the relationship effectiveness value 202, is a level of communication, a second significant component 206 is a level of joint-work, a third significant component is a quality of interaction 208, and a final fourth significant component 210 accounts for a connectivity of social structure for the collaborative relationship. As previously discussed, the selection of these four primary components 204, 206, 208, 210 for the model 200 relates to the analysis of the primary data collection to find significant features of the relationship based on the qualitative and quantitative data.

The level of communication component 204 comprises two communication sub-components, a communication frequency 220 and a communication importance 222. Good communication is frequently cited as an ideal component that both entities would like to develop in a collaborative relationship, and is appropriately characterized in terms of the frequency of communication, as well as the importance of the communication.

Joint work, or the process of achieving the primary goals of the thrust areas of the collaborative relationship is generally the motivating force behind establishing and continuing the relationship. To further characterize the level of the joint work component 206, it comprises two sub-components, a joint work importance 224 and a joint work frequency 226.

Generally, at least three crucial cultural themes are identified as significant features from the qualitative data: trust, cooperation, and conflict, each of which have a direct impact on the quality of the interaction. "Quality" of interaction refers to the characterization of the interaction, including the level, type, and extent of interaction, which may reveal whether the interaction in a relationship is positive, negative, or neutral. The quality of interaction component 208 thus comprises three sub-components, a cooperation component 228, a conflict component 230, and a trust component 232.

The fourth component is the connectivity of social structure 210 of the relationship, and comprises two separate sub-groups of sub-components. The first connectivity of social structure component subgroup is structure 240, which in certain preferred embodiments is derived from basic sociometric, egocentric, and statistical data analysis, as well as network visualization, previously described above, relates to the connections and connectivity in the collaborative relationship structure, and comprises: a density sub-component 242, a transitivity sub-component 244, and a betweeness centrality sub-component 246. The density sub-component 242 provides a measure for the overall amount of "connectedness" in a network. Density is measured by counting the total number of connections that exist between people in a group, and then counting the total number of possible connections. Dividing the existing connections by the potential connections produces a number that identifies the proportion of all existing ties among individuals to all potential ties. The higher the number, the denser the network, providing more opportunities for alternate routing through the network in case of failure of one or more links. The transitivity sub-component 244 is a sociometric measure that identifies the proportion of triples (i.e., three people all connected to each other) that are connected, compared with the possible total number of these triples that are connected. It provides a measure of the connections between the individuals who are connected to a central person, rather than a simple measure of all connections. It is similar to the density sub-component 242 in that is provides another way of looking at the overall connectedness and stability of a network. The formal definition for the betweeness centrality sub-component 246 is the number of times a vertex occurs on a geodesic. The betweeness centrality measure for each person in a network allows identification of "key players" or individuals who act as special nodes, or positions, in a network. These individuals can control the flow of information, influence others, or hold the network together. These sub-components 242, 244, 246 of the subgroup structure 240 of connectivity of social structure component 210 of the model 200 can be useful for diagnosing any deviations from the ideal relationship structures.

The second connectivity of social structure subgroup is role dynamics 250, which relates to the role dynamics of key players in the collaborative relationship, and includes one positive and one negative force determined from the sociometric data. Thus, the second subgroup role dynamics 250 comprises a reach sub-component 252 and a fragmentation sub-component 254. A measure of reach identifies the key individual or individuals who are linked to as many distinct relationship participants as possible. The reach component 252 provides a measure for the proportion of the total network that a single individual is in either direct or indirect contact with at a given point in time. Thus, the individual can easily contact and/or influence either the whole network or major parts of it directly or through a minimum number of intermediaries. The fragmentation component 254 is a measure of the amount of dislocation of individual components in the network caused by the removal of key players, as assessed by the key players connections to others in the network.

The overall connections between the four main components 204, 206, 208, 210 of the relationship effectiveness value 202 of the model 200 of the present invention, can be illustrated as an interactive web shown in FIG. 2. Each of the four components, 204, 206, 208, 210 in turn, is a composite of key collaboration or relationship effectiveness components (e.g. 220, 222, 224, 226, 228, 230, 232, 242, 244, 246, 252, 254) that further define behavior and interactions. Thus, the four main components, 204, 206, 208, 210 or features, are calculated as a weighted average of the contributing subcomponents, 220, 222, 224, 226, 228, 230, 232, 242, 244, 246, 252, 254, the weight of which are determined from the data analysis previously described. Each component is connected to the final quantitative relationship effectiveness value 202, which is calculated as a weighted average of all four of the components 204, 206, 208, 210.

The systems dynamics (SD) approach incorporated into the model of preferred embodiments of the present invention describes a current state of interactions and simulates the possible interactions between the components of the model to explore evolving processes and interrelatedness. This methodology is a standard way to examine the model at the system level. It has the ability to represent the emerging behavior of interacting loops of balancing, reinforcing or draining feedback, the ability to represent nonlinear effects, and the use of continuous time representation. The SD simulation represents the basic components of the model as stocks of levels of interactions, or state variables that change over time, flowing ultimately to form relationship dynamics.

As shown In FIG. 3, the quality of interaction component 208 was represented using building blocks 300 of this environment. The components for cooperation 228, conflict 230, and trust 232 are stocks 302 (rectangles), which accumulate an input data 304 that flows into them. Low, medium, or high levels of the input data 304 can be selected via the converters 306 (circles) which calculate the algebraic relationships. Flow paths 310 (shown as arrows representing the flow paths 310) are the routes by which data flows over time to form quality of interaction. The quality of interaction 208 is represented as a converter 312 that converts the data inputs 304 flowing through all building blocks 300 (e.g. 228, 230, 232) and flow paths 310 into an output 314. Such stocks, converters, and flows are used for all components and sub-components of the present invention, in a similar manner to incorporate SD for handling dynamic collaborative relationships.

FIG. 4 shows the steps by which the simulation of the model proceeds. At step 400, the stocks are initialized based on input values 402 gathered from quantitative and/or qualitative data that relates to at least one of, and preferably all of, the sub-components: communication frequency 220, communication importance 222, joint-work importance 224, joint-work frequency 226, quality of interaction conflict 230, quality of interaction trust 232, and quality of interaction cooperation 228, density 242, transitivity 244, betweeness centrality 246, reach 252 and fragmentation 254.

Flow rates for all components are calculated next at 410, which are a temporal feature derived from the empirical baseline data, to reflect how these stocks behave over time. It is preferred that the collaborative relationships generating the baseline data, are at different stages in their relationship lifecycle when data is collected, Therefore, the empirical baseline data can be used to create a hypothetical five-year timeline, with each respective collaborative relationship representing an example for a generic collaborative relationship at that particular stage of development. The rate of change for stocks is determined as the slope of the best-fit line between the data points using regression analysis.

In step 420, the model is calibrated with the weights for functional relationships, behavioral assumptions, qualitative findings and patterns from the survey results. In certain preferred embodiments, assumptions are made regarding the process of distributing weights to the respective components and sub-components, including the following which are exemplary: trust, communication, the quality of interaction, conflict, joint work level, and connectivity of social structure, which is composed of sociometric sub-components (e.g. density, centrality, reach, fragmentation, and transitivity).

In the next stage of the simulation using the model indicated at step 430, Euler's method is used to estimate the changes over time to estimate change in stocks over the interval dt, as previously described, where $\Delta_{stock}$=dt(flow), where flow is the rate of change corresponding to the evolutionary stage of the collaborative relationship cycle, and new value for stocks is calculated as $stock_t$=$stock_{(t-dt)}$+ $\Delta_{stock}$. The calculated approximations are then compared with the baseline collaborative relationship behavior to calibrate the model at 420.

At 430, change over time is estimated by setting the simulation time step (interval dt) is set to 0.25, where the unit of time is a year. The interval of time between calculations is set to ¼th year. The simulated environment should reflect changes over time, and thus, this time interval over which calculations are performed, simulates the pattern observed from the empirical data. However, the time interval is merely exemplary and may vary to suit different assessment needs, as one of skill in the art recognized. At 440, the model is then initialized to steady state.

The impact of variations in sub-components affect the overall relationship effectiveness value. Thus, as appreciated by one of skill in the art, one or more of these components or sub-component levels may be changed (e.g. the levels varied) to simulate potential relationship outcomes, as shown at 450. In this manner, the impact of each significant feature on the overall relationship can be simulated and used as a predictive tool for ascertaining the overall health of the collaborative relationship, or for predicting potentially problematic areas in the relationship that should be addressed. The overall relationship value is a weighted average of the components and sub-components, thus the relationship effectiveness value Is then calculated by the model at 460. The output of the SD model is displayed graphically and saved to file for further analysis at 470. The output 470 may be compared to other output values (e.g. to exemplary baseline values) to characterize a condition of the relationship based upon the generated relationship effectiveness value output 470.

The present invention links the quantitative data to qualitative data at several key junctions developed from research corresponding to the present invention. In particular, the present invention provides a model that incorporates the design of research tools such as the social-network survey (including choice of participants and specific questions), as well as ways of validating the general evolutionary trends in the model derived from the qualitative data. The significant features which generated the components of the model, have been shown to correlate well with the statistical analysis of survey data, sociometric analysis of the social-structure data, as well as with other validation exercises.

One preferred embodiment of the present invention is a method for modeling relationship dynamics of collaborative partnership relationships. Data is input into a model, which comprises a plurality of components, including level of joint work, level of communication, quality of interaction, and connectivity of social structure of relationship. Each of the components is interrelated to one another. Further, where the model is dynamic at least one of the components is a function of a time in the model. Data relative to the collaborative relationship corresponding to respective components, is processed in the model. In certain preferred embodiments, the data may include a time identifier and/or correspond to a select evolutionary stage or lifecycle of the relationship being analyzed. An output value indicative of a condition of the relationship performance is calculated from the data processed in the model.

In certain alternate preferred embodiments, this value of relationship performance is compared to an exemplary baseline value generated within the model, to provide an assessment of the relationship. Thus, it is possible to evaluate an existing relationship, as well as predict future aspects and performance of a collaborative relationship. The baseline value may be derived from either empirical data, or from simulated data developed by software programs. As previously discussed, it is preferred that the baseline data is empirical, however, either empirical or simulated data is feasible to develop an accurate assessment of the collaborative relationship.

The description of the invention is merely exemplary in nature and, thus, variations that do not depart from the gist of the invention are Intended to be within the scope of the invention. Such variations are not to be regarded as a departure from the spirit and scope of the invention.

What is claimed is:

1. A method of modeling a collaborative relationship comprising:
   a) inputting data relative to the collaborative relationship into a computer model, wherein said data relates to joint work, communication, interaction, and social structure of the collaborative relationship;
   b) analyzing said data with said model by using at least one method of analysis selected from the group consisting of statistical analysis, egocentric network analysis, sociometric analysis, network visualization analysis, and combinations thereof, wherein said model comprises components including level of joint work, level of communication, quality of interaction and connectivity of social structure of relationship, wherein said level of joint work comprises a joint work importance component and a joint work frequency component, said quality of interaction component comprises a cooperation component, a conflict component, and a trust component, and said model tracks interrelationships between said components, wherein said analyzing computes a weighted value for each of said respective components, and wherein said model generates an output value; and
   c) determining a condition of the collaborative relationship that is related to said output value generated by said model.

2. The method according to claim 1, wherein said model tracks at least one of said components as a function of time.

3. The method according to claim 1, wherein said model tracks each of said components as a function of time.

4. The method according to claim 3, wherein said time relates to a stage of a life cycle of the collaborative relationship.

5. The method according to claim 1, wherein at least some of said data includes a time identifier.

6. The method according to claim 1, wherein said level of communication component comprises a communication frequency component and a communication importance component.

7. The method according to claim 1, wherein said connectivity of social structure component comprises a first subgroup related to a structure of the collaborative relationship and a second subgroup of related to role dynamics of the collaborative relationship.

8. The method according to claim 7, wherein said first subgroup of components comprises a density component, a transitivity component, and a betweeness centrality component, and said second subgroup comprises a reach component and a fragmentation component.

9. The method according to claim 1, wherein said connectivity of social structure of relationship component comprises a density component, a transitivity component, a centrality component, a reach component, and a fragmentation component.

10. The method according to claim 1, wherein at least one of said components employs system dynamics.

11. The method according to claim 10, wherein said systems dynamics incorporates stocks, converters, and flows within said model to change said components with respect to time.

12. The method according to claim 1, wherein each of said components is assigned a relative weighted value with respect to a total value for all of said components, wherein said total value relates to said output value.

13. The method according to claim 1, determining further comprises comparing said output value to a baseline value that is also generated by said model.

14. The method according to claim 1, further comprising validating an accuracy of said model by comparing said output value to an exemplary value representing an exemplary collaborative relationship generated by said model.

15. A method of modeling relationship dynamics of collaborative relationships, the method comprising:
   a) inputting data relative to the collaborative relationship into a computer model, wherein said data relates to joint work, communication, interaction, and social structure of the collaborative relationship;
   b) determining an output value of the collaborative relationship by analyzing said data with said model by using at least one method of analysis selected from the group consisting of statistical analysis, egocentric network analysis, sociometric analysis, network visualization analysis, and combinations thereof, wherein said model comprises components including level of joint work, level of communication, quality of interaction and connectivity of social structure of relationship, wherein said level of joint work comprises a joint work importance component and a joint work frequency component, said quality of interaction component comprises a cooperation component, a conflict component, and a trust component, and said model tracks interrelationships between said components and at least a portion of said components as a function of time, wherein said analyzing computes a weighted value for each of said respective components;
   c) determining a condition of the collaborative relationship by comparing said output value to a baseline value generated by said model.

16. The method according to claim 15, wherein said model tracks each of said components as a function of time.

17. The method according to claim 15, wherein said time relates to a stage of a life cycle of the collaborative relationship.

18. The method according to claim 15, wherein at least some of said data includes a time identifier.

19. The method according to claim 15, wherein said baseline value corresponds to a representative lifecycle stage.

20. The method according to claim 15, wherein said level of communication component comprises a communication frequency component and a communication importance component.

21. The method according to claim 15, wherein said connectivity of social structure component comprises a first subgroup of components related to structure of the collaborative relationship and a second subgroup of components related to role dynamics of the collaborative relationship.

22. The method according to claim 21, wherein said first subgroup of components comprises a density component, a transitivity component, and a centrality component, and said second subgroup comprises a reach component and a fragmentation component.

23. The method according to claim 15, wherein said connectivity of social structure component comprises a density component, a transitivity component, a centrality component, a reach component, and a fragmentation component.

24. The method according to claim 15, wherein at least one of said components employs system dynamics to account for said function of time.

25. The method according to claim 24, wherein said systems dynamics incorporates stocks, converters, and flows within said model to change said components with respect to said time.

26. The method according to claim 15, wherein each of said components is assigned a relative weighted value with respect to a total value for all of said components, wherein said total value relates to said output value.

27. The method according to claim 15, further comprising validating an accuracy of said model by comparing said output value to an exemplary value representing an exemplary collaborative relationship generated by said model.

* * * * *